US012590489B2

(12) United States Patent
Ehrenpfordt et al.

(10) Patent No.: US 12,590,489 B2
(45) Date of Patent: Mar. 31, 2026

(54) WINDOW OR DOOR, AND BUILDING WALL COMPRISING SAID WINDOW OR DOOR

(71) Applicant: REHAU AG + CO, Rehau (DE)

(72) Inventors: Ricardo Ehrenpfordt, Zwickau (DE); Constanze Ranfeld, Langen (DE); Erik Schubert, Höchstadt (DE)

(73) Assignee: REHAU INDUSTRIES SE & CO. KG, Rehau (DE)

( * ) Notice: Subject to any disclaimer, the term of this patent is extended or adjusted under 35 U.S.C. 154(b) by 487 days.

(21) Appl. No.: 18/010,796

(22) PCT Filed: Jul. 1, 2021

(86) PCT No.: PCT/EP2021/068204
§ 371 (c)(1),
(2) Date: Dec. 15, 2022

(87) PCT Pub. No.: WO2022/008345
PCT Pub. Date: Jan. 13, 2022

(65) Prior Publication Data
US 2023/0235618 A1 Jul. 27, 2023

(30) Foreign Application Priority Data
Jul. 7, 2020 (DE) ......................... 202020103920.2

(51) Int. Cl.
*G02F 1/157* (2006.01)
*E06B 3/22* (2006.01)
(Continued)

(52) U.S. Cl.
CPC .............. *E06B 3/6722* (2013.01); *E06B 3/22* (2013.01)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS

2005/0166495 A1* 8/2005 Cho .......................... E06B 7/12 52/204.5
2014/0021903 A1* 1/2014 Seiling .................. H02J 7/0042 52/173.3
(Continued)

FOREIGN PATENT DOCUMENTS

DE 202017107483 U1 3/2019
WO 2012079159 A1 6/2012
(Continued)

OTHER PUBLICATIONS

European Patent Office, International Search Report in PCT/EP2021/068204, dated Oct. 14, 2021.
(Continued)

*Primary Examiner* — Dawayne Pinkney
(74) *Attorney, Agent, or Firm* — Aird & McBurney LP

(57) ABSTRACT

The present invention relates to a window (2) or a door, comprising: •(a) a frame or casing; •(b) at least one sash (3) formed of portions of a hollow-chamber profiled element (4); •(c) a planar element (11), which is accommodated in the sash (3), the planar element comprising a functional element (13), the light transmission properties of which can be varied at least in some regions when a voltage is applied; and •(d) a control element (12; 12'), which is designed to control the functional element (11); wherein according to the invention the window or the door is characterized in that the control element (12; 12') is of a multi-part design and at least one constituent part (12) of the control element (12; 12') is at least partly accommodated in a hollow chamber (5) of the sash (3). The present invention also relates to a building wall
(Continued)

Figure 1:
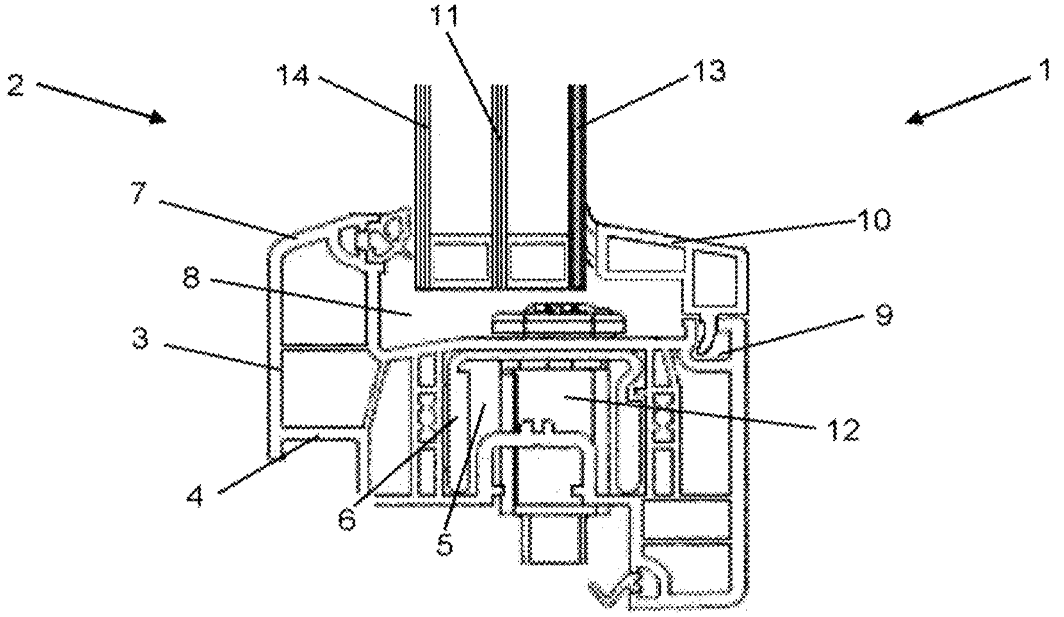

(100) having at least one opening in which a window (2) or door of this type is accommodated.

15 Claims, 2 Drawing Sheets

(51) Int. Cl.
*E06B 3/67* (2006.01)
*G02F 1/15* (2019.01)
*G02F 1/1503* (2019.01)
*G09G 3/19* (2006.01)

(58) Field of Classification Search
USPC ................ 359/265–275, 277, 245–247, 242; 345/49, 105
See application file for complete search history.

(56) References Cited

U.S. PATENT DOCUMENTS

2014/0259931 A1* 9/2014 Plummer .................. E06B 3/66 361/679.01
2014/0349497 A1 11/2014 Brown et al.
2015/0219975 A1* 8/2015 Phillips ..................... E06B 9/24 359/275
2016/0154290 A1* 6/2016 Brown .................. E06B 3/6722 359/275
2018/0195340 A1 7/2018 Satoh et al.
2020/0019035 A1 1/2020 Wang et al.

FOREIGN PATENT DOCUMENTS

WO 2014032023 A1 2/2014
WO 2019241264 A2 12/2019

OTHER PUBLICATIONS

European Patent Office, Written Opinion in PCT/EP2021/068204, dated Jan. 13, 2022.
German Patent and Trademark Office, Research Report in German Application 20 2020 103 920.2, dated Apr. 29, 2021.

* cited by examiner

WINDOW OR DOOR, AND BUILDING WALL COMPRISING SAID WINDOW OR DOOR

The present invention relates to a window or door, which comprises: a frame or casing; at least one sash formed of portions of a hollow-chamber profiled element; a planar element, which is accommodated in the sash, the planar element comprising a functional element, the light transmission properties of which can be varied at least in some regions when a voltage is applied; and a control element, which is configured to control the functional element. Furthermore, the present invention relates to a building wall which has at least one opening in which such a window or such a door is accommodated.

Such windows or doors with a planar element which has variable light transmission properties are known from the prior art. For example, WO 2012/079159 A1 describes a window having variable light transmission properties. The positioning of the control elements for such a window is not disclosed in WO 2012/079159 A1. Control elements in the form of standalone controllers are known from commonly known prior use. It is considered a disadvantage of such standalone controllers that they cannot be integrated in the window, in the door or in the building wall surrounding same. Furthermore, the currently known controllers are limited in functionality.

Accordingly, the present invention is based on the object of providing a window or door which at least partially overcomes the disadvantages of the prior art. In particular, the composite pane element according to the invention or door according to the invention is intended to have advantages over the prior art from optical and technical standpoints. Furthermore, the object of the present invention consists in providing a building wall having at least one opening in which such a window or such a door is accommodated.

These and other objects are achieved according to the invention by a window or door having the features of Claim 1 and by a building wall having the features of Claim 8. Preferred embodiments of the present invention are described in the dependent claims.

According to the present invention, it has been found that a partial integration of the controller in the window or door can be done easily when the controller or control element is of a multi-part design and at least one of the constituent parts of the control element is accommodated in a hollow chamber of the sash. This constituent part of the control element can comprise, for example, the interfaces for actuating a functional element of the planar element accommodated in the sash, wherein the functional element changes its light transmission properties when a voltage is applied. The other constituent part of the control element can be arranged in the surroundings of such a window or such a door, preferably as a flush-mounted solution, which is accommodated in the building wall surrounding such a window or such a door and is only visible from the outside via a panel which preferably comprises the operating elements for operating the control element.

Accordingly, the present invention consists in providing a window or door which comprises: (a) a frame or casing; (b) at least one sash formed of portions of a hollow-chamber profiled element; (c) a planar element, which is accommodated in the sash, the planar element comprising a functional element, the light transmission properties of which can be varied at least in some regions when a voltage is applied; and (d) a control element, which is configured to control the functional element; wherein according to the invention the window or door is characterized in that the control element is of a multi-part design and at least one constituent part of the control element is at least partially accommodated in a hollow chamber of the sash. Furthermore, the present invention relates to a building wall having at least one opening in which a window according to the invention or a door according to the invention is accommodated.

As used herein, the term “window” or “door” preferably refers to a plastic window or a plastic door. However, metal windows and composite windows and correspondingly metal doors and composite doors are also suitable. If it is a plastic window or a plastic door, the preferred main material of the hollow-chamber profiled elements of the window according to the invention or the door according to the invention is polyvinyl chloride (PVC), in particular hard PVC (PVC-U) or glass-fiber-reinforced PVC, which can in each case also contain post-chlorinated PVC (PVC-C) and to which additional additives such as stabilizers, plasticizers, pigments and the like are added. A sash can be obtained by fusing miter-cut pieces of the hollow-chamber profiled elements.

In relation to the window according to the invention or the door according to the invention, it can be advantageous if the constituent part of the control element at least partially accommodated in a hollow chamber of the sash has electrical interfaces. This allows a simple power supply to this constituent part of the control element and a simple possibility of communicating between the constituent parts of the control element. It is particularly favorable in this case if the electrical interfaces are arranged on two mutually opposing sides of a housing of said constituent part. In this way, it is possible to make the connection of this constituent part from the side facing away from the planar element and furthermore to establish a connection from the control element to the functional element. From this standpoint, it is particularly preferred if at least one of the interfaces is arranged on the side of the housing of this constituent part facing the planar element. This allows a simple integration of this constituent part of the control element in the window according to the invention or in the door according to the invention. With regard to the second alternative, it is particularly preferred if the cut-out in which this constituent part of the control system is accommodated is arranged on the side of the hollow-chamber profiled element facing away from the planar element. As a result, the integration of this constituent part in the hollow-chamber profiled element of the window according to the invention or of the door according to the invention is simplified further.

It can likewise be useful if at least one sealing element is arranged at least partially between the housing of the constituent part and the hollow-chamber profiled element of the sash or in the region of at least one of the interfaces of the control element of the sash. Such a sealing element or multiple such sealing elements form sufficient protection of the constituent part of the control element introduced into a hollow chamber of the sash profiled element from penetrating moisture and thus ensure safe and long-lasting operation of the functional element.

Additionally or alternatively to this, it can also be advantageous if the constituent part at least partially accommodated in a hollow chamber of the sash is contacted via power rails. This ensures a safe supply of power and signals to this constituent part of the control element. In preferred embodiments, the power rails can be arranged in the sash or accommodated in the hollow-chamber profiled element of the sash. This ensures safe installation of the power rails in the sash.

Furthermore, it can also prove useful if the constituent part at least partially accommodated in a hollow chamber of the sash can be contacted inductively, wherein at least one induction coil which can be used for this is arranged in the sash or accommodated in the hollow-chamber profiled element of the sash. This also contributes to the ease of installation of the window according to the invention or of the door according to the invention.

With regard to the building wall according to the invention, it can be beneficial if the control element of multi-part design comprises at least one further constituent part which is at least partially accommodated in the building wall. Expediently, this further constituent part of the control element is accommodated in the building wall in the relatively close surroundings of the window according to the invention or the door according to the invention (preferably at a distance of no more than approximately one meter). This makes it easy to tell which window according to the invention or which door according to the invention can be influenced via this constituent part of the control device. It is likewise conceivable for the further constituent part to be situated in the relatively close surroundings of a door which forms an entry point into a room to which the window according to the invention or the door according to the invention can be assigned.

"The further constituent part" of the control element is referred to below. However, this should be understood to mean one further constituent part or multiple further constituent parts of the control element. In preferred embodiments, the constituent part accommodated in the hollow chamber of the hollow-chamber profiled element can be in the form of a master element which can actuate one or more, preferably at least 2, 3, 4, 5 etc. slave elements. These slave elements can each be assigned to a window according to the invention or to a door according to the invention, or multiple, in particular all, slave elements can be assigned to a window according to the invention or to a door according to the invention.

It can also prove helpful if the further constituent part of the control element is configured to provide the power supply to the constituent part of the control element at least partially accommodated in a hollow chamber of the sash. Such a configuration of the multi-part control element allows simple installation of the window according to the invention or of the door according to the invention in the building wall. It can likewise be advantageous if the further constituent part of the control element is configured such that it can actuate multiple constituent parts of control elements, which are at least partially accommodated in a hollow chamber of the sash of a window according to the invention (which can be the case with a combination of multiple windows according to the invention and of multiple windows according to the invention with at least one door according to the invention). This is particularly advantageous because in this way not every window according to the invention requires a separate, dedicated power supply.

It can also be favorable if the constituent part of the control element at least partially accommodated in a hollow chamber of the sash and the further constituent part of the control element are connected to one another for communication. For this, a BUS connection, in particular CAN, has proven particularly favorable.

In preferred embodiments of the building wall according to the invention, the further constituent part of the control element can be in the form of a flush-mounted element. Such embodiments are particularly visually appealing.

It can also prove preferable if the further constituent part of the control element comprises an input element. Such an integration of a possibility for the user to make an input into the control element reduces the number of components for the window according to the invention or for the door according to the invention and thus ensures simplified installation. It is particularly preferred if the input element is touch-sensitive. A touch-sensitive design of the input element allows intuitive operation of the window according to the invention or of the door according to the invention.

In further preferred embodiments of the building wall according to the invention, the functional element can comprise at least two functional zones, the light transmission properties of which can be varied individually when a voltage is applied to the functional zone. Such a design of the functional element allows privacy properties which can be varied by region and can be generated by the planar element of the window according to the invention or of the door according to the invention.

In this case, the planar element is preferably a composite pane element with light transmission properties which can be electrically controlled by region. Such a composite pane element preferably comprises a first pane element and a second pane element, wherein there is an interstice between the first pane element and the second pane element. The functional element is then preferably arranged in the interstice between the two pane elements. In this case, the functional element preferably comprises at least two functional zones, the light transmission properties of which can be varied individually when a voltage is applied to the functional zone, and each functional zone comprises a contact point. The composite pane element can further comprise at least one conductor carrier, which comprises at least a number of contact regions corresponding to the number of functional zones of the functional element and, for each contact region, a conducting element assigned to this contact region, wherein each contact point of the functional element is contacted by a contact region of the conductor carrier.

In the composite pane element, the contact points of the functional element can be arranged in the interstice between the pane elements. The contact points of the functional element thus lie protected between the pane elements of the composite pane element, which further increases its robustness. Additionally or alternatively, at least the contact regions of the conductor carrier can be arranged in the interstice. Firstly, this makes the contact points of the functional element more easily accessible, when these are likewise in the interstice between the pane elements, secondly, this further increases the robustness of the composite pane element. Likewise, the conducting elements of the conductor carrier can have at least two layer-like metal plies electrically insulated from one another. This ensures that the conductor carrier can have a small width and can be arranged particularly advantageously at least partially between the pane elements in order to increase the robustness further. It can also be preferred if the conductor carrier has additional contact regions with a common conducting element, which contact a further contact point of each functional element. It is thus possible to contact the common, additionally required contact of all the functional zones ("common contact") by means of the conductor carrier as well. A composite pane element configured in this way is then used in the window according to the invention or in the door according to the invention such that it forms the pane of a multi-pane insulating glazing facing the room.

Preferably, the functional element is in the form of an SPD functional element, PDLC functional element, EC functional element or a combination of the aforementioned functional elements. Such functional elements form the established active layers, the optical properties of which, such as opacity and/or transparency, can be changed by varying a voltage applied to the functional element. In the case of SPD functional elements, light-absorbing or light-reflecting particles, preferably with an average diameter of less than 1 μm, are suspended in a liquid in an active layer. A transparent, conductive layer (e.g. indium tin oxide, ITO) is situated on both sides of the suspension. When a voltage is applied, the suspended particles are oriented. The functional element becomes transparent as a result. Examples of SPD (suspended particle device) functional elements are, for example, the elements described in EP 0 876 608 B1 and WO 2011/033313 A1. In the case of a PDLC (polymer dispersed liquid crystal) functional element, liquid crystals are embedded in a polymer matrix as the active layer. On both sides of this active layer there is again a transparent, conductive layer (e.g. indium tin oxide, ITO). The liquid crystals cause a high level of scattering of the light shining through the active layer, and the functional element is non-transparent or opaque. When a voltage is applied, the liquid crystals are oriented towards one another, so that the light transmission through the functional element is increased. The functional element becomes transparent. An EC (electrochromic device) functional element is transparent when no voltage is applied to the functional element. When a voltage is applied, the optical properties, in particular the color of the functional element, change as a result of a reversible chemical process. The EC functional element remains transparent but appears darker when a voltage is applied. The degree of darkening can be adjusted continuously by varying the applied voltage.

The conductor carrier can comprise a connection element which is arranged outside the interstice. This considerably simplifies the connection of the composite pane element to the control device, for example a controller. In this case, it can also prove favorable if the connection element has a number of connection points corresponding to the number of conducting elements of the conductor carrier. This contributes further to a simple connection of the components. The conductor carrier preferably has electronic units which are assigned to the contact regions and bundle the conducting elements of the contact regions to form a common bus-based conducting region. This makes it possible to considerably reduce the number of conducting elements which are routed via the conductor carrier to the connection element and the number of connection points of the connection element and the number of connection points on the control device. The overall dimensions of all the components are considerably reduced as a result. The conductor carrier can comprise further electronic modules, in particular sensors, which are configured in particular for detecting accelerations, temperature, moisture, pressure, light, turbidity, sound, air quality and the like. It can be possible by means of the acceleration sensor system and/or sound sensor system to detect, inter alia, mechanical effects on the composite pane element in the event of a break-in. By means of the temperature, moisture, pressure and light quality sensor systems, climate monitoring can be implemented. It can thus be practical, inter alia, to switch the functional elements within a control chain on the basis of measured temperatures in order, inter alia, to prevent excessive heating of a room or to allow this. By means of the light sensor system, it can be possible to switch the functional elements within a control chain automatically on the basis of the measured light incidence. In addition, the light sensor system and turbidity sensor system can be used to monitor the satisfactory functioning of the functional elements and the entire system as far as the controller after installation and throughout its service life.

The planar element of the window according to the invention or of the door according to the invention is preferably in the form of insulating glazing, wherein the composite pane element forms a pane of this insulating glazing, which is assembled by means of one or more edge connectors with one or more further panes to form the insulating glazing. Preferably, the composite pane element forms the pane of the insulating glazing facing the room. In principle, however, it is also conceivable for the composite pane element to be used as the sole glazing element in the window according to the invention or in the door according to the invention.

The pane elements are preferably made of glass, in particular float glass, quartz glass, flat glass, soda-lime glass, borosilicate glass, or of clear plastics such as polycarbonate (PC) or polymethyl methacrylate (PMMA). The pane elements are preferably clear and transparent but can also be tinted or colored. The pane elements have a thickness of preferably 1 mm to 5 mm. In principle, the composite pane element can have any desired shape, but rectangular designs are preferred. The composite pane element is preferably substantially flat or slightly or greatly curved.

In alternative embodiments, the functional element can also be in the form of a functional film, which is laminated onto a pane of the planar element, in particular of the insulating glazing. In particular the pane of the insulating glazing facing the room has proven particularly favorable as the pane onto which the functional element in the form of a functional film is laminated. In this case, the functional film is preferably laminated onto the side of the pane facing away from the room.

The functional element has electrically controllable optical properties and is preferably divided into at least two functional zones. The central constituent part of each functional zone is an active layer, which is different depending on the type of functional element. In preferred embodiments of the present invention, the functional element is in the form of a PDLC functional element. Then, non-oriented liquid crystals are contained in a polymer matrix in the active layer. This results in a high level of scattering of the light shining through. Without voltage being applied, the PDLC functional element has a white, milky appearance, which can act as a privacy screen, for example. When a voltage is applied to the active layer, the liquid crystals are oriented in one direction, and the transmission of light through the active layer is increased. The composite pane element according to the invention becomes transparent as a result. On each side of the active layer there is an electrically conductive coating acting as a planar electrode. The electrically conductive coatings are transparent. These can preferably be layers of ITO (indium tin oxide), which are often only a few nanometers thick. Adjoining them on both sides are carrier films, which are preferably polymer films, in particular PET films. The thickness of the carrier films is within the range of 0.02 mm to 3 mm, preferably within the range of 0.25 mm to 1 mm. The outer sides of the functional element and thus the connection to the pane elements are often formed by intermediate layers. The intermediate layers are preferably thermoplastic films, in particular films of polyvinyl butyral (PVB) with a thickness within the range of 0.02 mm to 3 mm, preferably within the range of 0.25 mm to 1 mm.

The window according to the invention, the door according to the invention, the building wall according to the invention and individual parts thereof can also be produced in rows or in layers using a row-building or layer-building manufacturing method (e.g. 3D printing), but production by means of extrusion is preferred.

Figure 2:
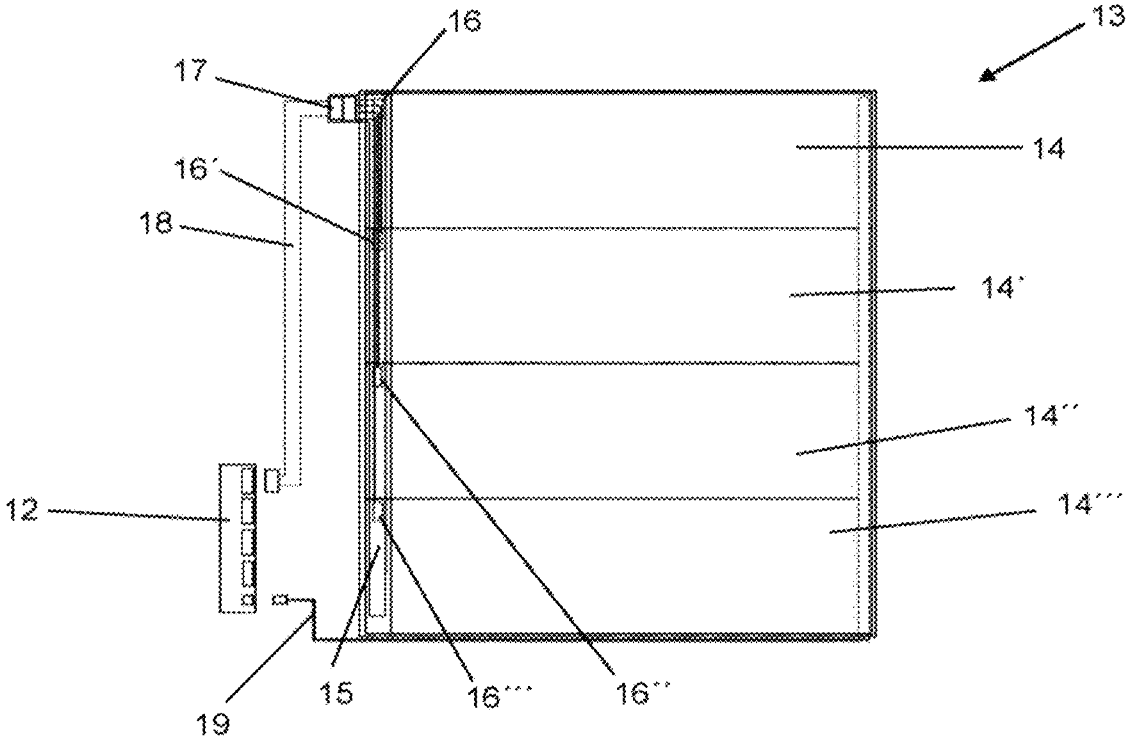
Figure 3:
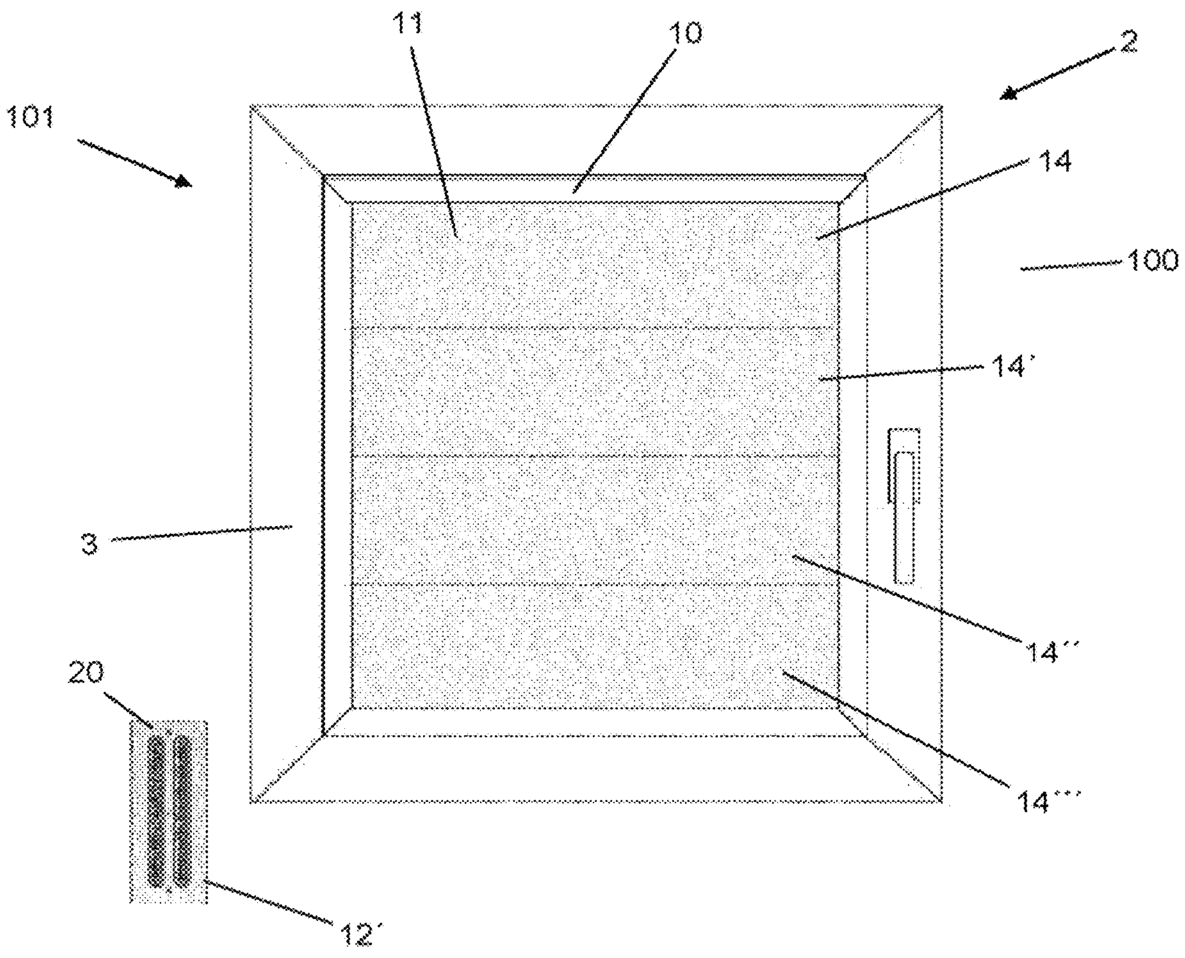

The present invention shall be explained in detail below with reference to the embodiments shown in the figures. Using the figures, the present invention is explained in detail with reference to a window according to the invention. However, it is self-evident that the statements in this respect can also be applied correspondingly to a door according to the invention. In the figures FIG. 1 shows a schematic cross-sectional diagram of a window according to an embodiment of the present invention;

FIG. 2 shows a schematic diagram of a functional element in the form of a composite pane element which is used in the embodiment of the window according to the invention shown in FIG. 1; and FIG. 3 shows a schematic view of a building wall with the window according to the embodiment of the present invention shown in FIG. 1.

FIG. 1 shows a detail of a cross-sectional diagram of an embodiment of a sash unit 1 of the window 2 according to the invention using the example of a plastic sash unit with a sash 3 in the form of a plastic hollow profiled frame. The sash 3 of the window 2 according to the invention is constructed of portions of a hollow-chamber profiled element 4. In the embodiment of the window 2 according to the invention shown in FIG. 1, the hollow-chamber profiled element 4 is produced from a thermoplastic polymer material, preferably polyvinyl chloride (PVC), in particular hard PVC (PVC-U) or glass-fiber-reinforced PVC, to which additional additives such as stabilizers, plasticizers, pigments and the like are added. The hollow-chamber profiled element 4 is constructed from a plurality of hollow chambers, which are each surrounded by webs of the sash 3. Centrally, the sash 3 comprises a main hollow chamber 5, in which a reinforcement element 6, in particular a steel reinforcement element, is accommodated. An upper web of the main hollow chamber 6 forms a glazing rebate 8 together with an outer lip 7. On the side opposite the outer lip 7, the sash 3 has a bead groove 9 in which a glazing bead 10 is anchored. In the embodiment shown in FIG. 1, the glazing bead 10 is situated on the side facing the room. The glazing bead 10 is used to stabilize a planar element 11 which is accommodated in the glazing rebate 8 and is in the form of insulating glazing, in particular insulating triple-glazing, in the embodiment shown in FIG. 1. The upper web of the main hollow chamber 5 is thus opposite the planar element 11 accommodated in the glazing rebate 8. By means of a glazing bridge (not shown) and a glazing packer (not shown) laid on its supporting surface, the planar element 11 is held in position in the sash 3.

In the main hollow chamber 5 of the sash 3 there is a constituent part 12 of a multi-part control element 12, 12'. The constituent part 12 of the multi-part control element 12, 12' is fed through a cut-out in the upper web and in the profiled element wall of the hollow-chamber profiled element 4 of the sash 3 opposite the upper web. In the embodiment shown in FIG. 1, the alarm element 6 is U-shaped. The constituent part 12 of the control system 12, 12' is then accommodated in the U-shape of the reinforcement element. On the side facing the planar element 11, the reinforcement element 11 has bores for the interfaces or connections of the further constituent part. In alternative embodiments, the constituent part 12 can also be arranged in such regions of the sash 3 in which there is no reinforcement element 6 in the main hollow chamber 5. It is likewise conceivable for the window according to the invention to have two or the door according to the invention to have no alarm elements. This has the advantage that the constituent part 12 accommodated in a hollow chamber 5 of the hollow-chamber profiled element 4 only has to be fed through cut-outs in the hollow-chamber profiled element 4, and therefore no complex bores in the alarm element 6 are necessary. In such cases, the hollow-chamber profiled element 4 is preferably in the form of a fiber-reinforced, in particular glass-fiber-reinforced hollow-chamber profiled element.

The constituent part 12 of multi-part control element 12, 12' is connected conductively to a functional element 13, which is in the form of a composite glass pane and, in the embodiment of the window 2 according to the invention shown in FIG. 1, forms the pane of the planar element 11, in the form of insulating triple-glazing, facing the glazing bead 10.

In the embodiment of the present invention shown in FIG. 1, the constituent part 12 of the control element 12, 12' has electrical interfaces. This allows a simple power supply to the constituent part 12 of the control element 12, 12' and a simple possibility of communicating between the constituent part 12 of the control element 12, 12' and the further constituent part 12' thereof. The electrical interfaces are preferably arranged on two mutually opposing sides of a housing of said constituent part 12. The connection of the constituent part 12 can thus be made from the side facing away from the planar element 11. Furthermore, a connection from the constituent part 12 of the control element 12, 12' to the functional element 13 can be established easily.

In the embodiment of the present invention shown in FIG. 1, the functional element 13 is in the form of a PDLC functional element. An exemplary functional element 13 which can be used in a window 2 according to the invention or in a door according to the invention is shown in a schematic diagram in FIG. 2.

In this embodiment, the functional element 13 comprises four functional zones 14, 14', 14'', 14''' and a conductor carrier 15; in another embodiment, the functional element 13 can also comprise a different number of functional zones 14, 14', 14'', 14'''. Each of the functional zones 14, 14', 14'', 14''' comprises at least one contact point 16, 16', 16'', 16''', at which the respective functional zone 14, 14', 14'', 14''' is electrically conductively contacted to the conductor carrier 15. The functional element 13 can be for example in the form of an SPD functional element, PDLC functional element, EC functional element or a combination of the aforementioned functional elements.

The conductor carrier 15 is arranged in an edge region of the functional element 13 and, in the embodiment shown, has four conducting elements of the conductor carrier 15, to each of which a functional zone 14, 14', 14'', 14''' of the functional element 13 is assigned.

The conducting elements of the conductor carrier 15 lead into a connection 17, which in turn has a socket into which a connector of a cable 18 is received, in particular plugged. Via the cable 18, the functional element 13 can be connected to the constituent part 12 of the multi-part control element 12, 12'. The constituent part 12 of the multi-part control element 12, 12' is at least partially accommodated in the main hollow chamber 5 of the sash 3. A conductor 19, which is connected to the functional zones 14, 14', 14'', 14''' of the functional element 13, can likewise be connected to the constituent part 12 of the multi-part control element 12, 12'.

The multi-part control element 12, 12' can be for example in the form of a controller. In addition to the constituent part 12, the multi-part control element 12, 12' also comprises a further constituent part 12'. The further constituent part 12' is connected to external power supply and additionally connected via cables or induction to the constituent part 12. As a result, a variable voltage, via which the light transmission properties of the planar element 11 can be varied, can be applied to the functional element 4 via the multi-part control element 12, 12'.

FIG. 3 schematically shows an embodiment of a building wall 100 according to the invention which has an aperture in which the window 2 according to the invention shown in FIG. 1 is accommodated. The planar element 11 is accommodated in the sash 3. When the window 2 according to the invention is in the closed state, the window sash unit 101 thus formed bears against a frame (not shown) via seals and is mounted rotatably on the frame via fittings (not shown).

The further constituent part 12' of the multi-part control element 12, 12' is accommodated in the building wall 100 within the surroundings of the window 2. The further constituent part 12 of the control element 12, 12' is configured to provide the power supply to the constituent part 12 of the control element 12, 12' partially accommodated in the main hollow chamber 5 of the sash. The constituent part 12 of the control element 12, 12' which is partially accommodated in the main hollow chamber 5 of the sash 3 and the further constituent part 12' of the control element are connected to one another for communication. This ensures exchange of information between the constituent parts 12, 12'. A BUS connection, in particular CAN, has proven suitable for this purpose.

In the embodiment shown in FIG. 3, the further constituent part 12' is in the form of a flush-mounted element. Only the operating surface 20 of the further constituent part 12' facing the room, which operating surface acts as the input element 20 for the control element 12, 12', protrudes out of the building wall 100 according to the invention. The operating surface 20 is touch-sensitive. Such a touch-sensitive design of the input element 20 allows intuitive operation of the window 2 according to the invention.

The present invention has been described by way of example with reference to the embodiment of the present invention shown in the figures. It is self-evident that the present invention is not limited to the embodiment shown in the figures, but rather the scope of the present invention results from the attached claims.

The invention claimed is:

1. A building wall having at least one opening in which a window or door is accommodated, the window or door, comprising:

(a) a frame or casing;

(b) at least one sash (3) formed of portions of a hollow-chamber profiled element (4);

(c) a planar element (11), which is accommodated in the sash (3), the planar element comprising a functional element (13), the light transmission properties of which can be varied at least in some regions when a voltage is applied; and (d) a control element (12; 12'), which is configured to control the functional element (11);

wherein the control element (12; 12') is of a multi-part design and at least one constituent part (12) of the control element (12; 12') is at least partially accommodated in a hollow chamber (5) of the sash (3), wherein the constituent part (12) at least partially accommodated in a hollow chamber (5) of the sash (7) is contacted via power rails, wherein the multi-part control element comprises at least one further constituent part which is at least partially accommodated in the building wall; wherein the constituent part of the control element at least partially accommodated in a hollow chamber of the sash and the further constituent part of the control element are connected to one another for communication; wherein the further constituent part of the control element are connected to one another for communication by means of a BUS connection, in particular CAN.

2. The window (2) or door according to claim 1, wherein the constituent part (12) of the control element (12; 12') which is at least partially accommodated in a hollow chamber (5) of the sash (7) comprises electrical interfaces.

3. The window (2) or door according to claim 2, wherein at least one of the interfaces is arranged on the side of the housing facing the planar element (11).

4. The window (2) or door according to claim 1, wherein the constituent part (12) of the control element (12; 12') which is at least partially accommodated in a hollow chamber (5) of the sash (7) is inserted in the longitudinal direction into the hollow chamber of the sash (7) or into a cut-out in the hollow-chamber profiled element (4) of the sash (7).

5. The window (2) or door according to claim 1, characterized in that at least one sealing element is arranged at least partially between the housing of the constituent part (12') and the hollow-chamber profiled element (4) of the sash (7) or in the region of at least one of the interfaces of the constituent part (12) of the control element (12; 12') accommodated in a hollow chamber (5) of the sash (7).

6. The window (2) or door according to claim 1, wherein the constituent part (12) at least partially accommodated in a hollow chamber (5) of the sash (7) is contacted inductively, wherein at least one induction coil which is used for this is arranged in the sash (7) or accommodated in the hollow-chamber profiled element (4) of the sash (7).

7. The building wall (100) according to claim 1, wherein the further constituent part (12') of the control element (12; 12') is configured to provide the power supply to the constituent part (12) of the control element (12; 12') at least partially accommodated in a hollow chamber of the sash (7).

8. The building wall (100) according to claim 1, wherein the further constituent part (12') of the control element (12; 12') is in the form of a flush-mounted element.

9. The building wall (100) according to claim 1, wherein the further constituent part (12') of the control element (12; 12') comprises an input element (20).

10. The building wall (100) according to claim 1, wherein the functional element (13) comprises at least two functional zones (14, 14', 14", 14"), the light transmission properties of which is changed individually when a voltage is applied to the functional zone (14, 14', 14", 14").

11. The building wall (100) according to claim 10, wherein the functional element is in the form of an SPD functional element, PDLC functional element, EC functional element or a combination of the aforementioned functional elements.

12. The window (2) or door according to claim 2, wherein the electrical interfaces are arranged on two mutually opposing sides of a housing of the constituent part (12).

13. The window (2) or door according to claim 4, wherein the cut-out is arranged on the side of the hollow-chamber profiled element (4) facing away from the planar element (11).

14. The window (2) or door according claim 1, wherein the power rails are arranged in the sash (7) or accommodated in the hollow-chamber profiled element (4) of the sash (7).

15. The building wall (100) according to claim 9, wherein the input element (20) is touch-sensitive.

* * * * *